Figure 4:
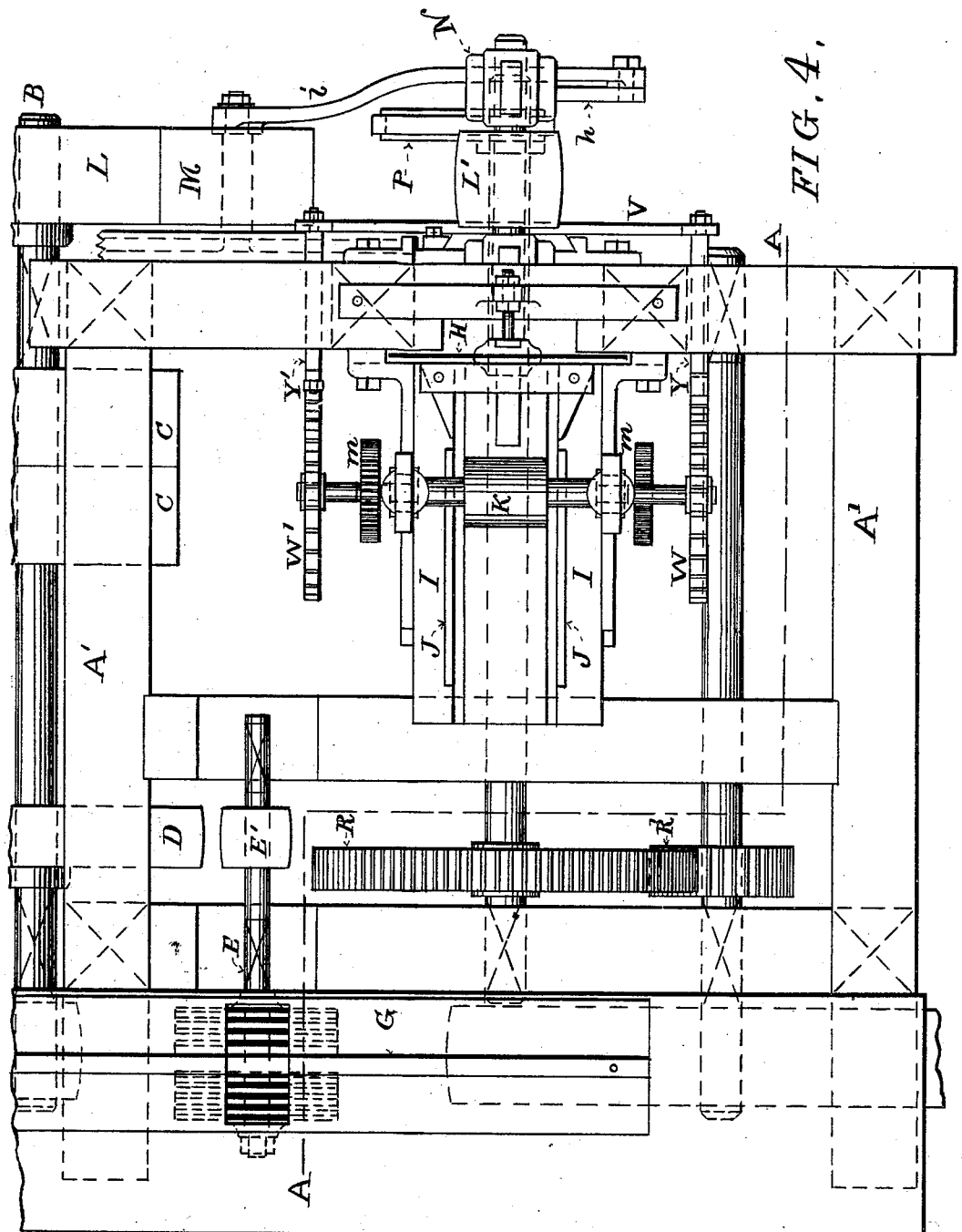

(No Model.) 3 Sheets—Sheet 1.
J. WARE.
MACHINE FOR MAKING HONEY FRAMES.
No. 384,549. Patented June 12, 1888.
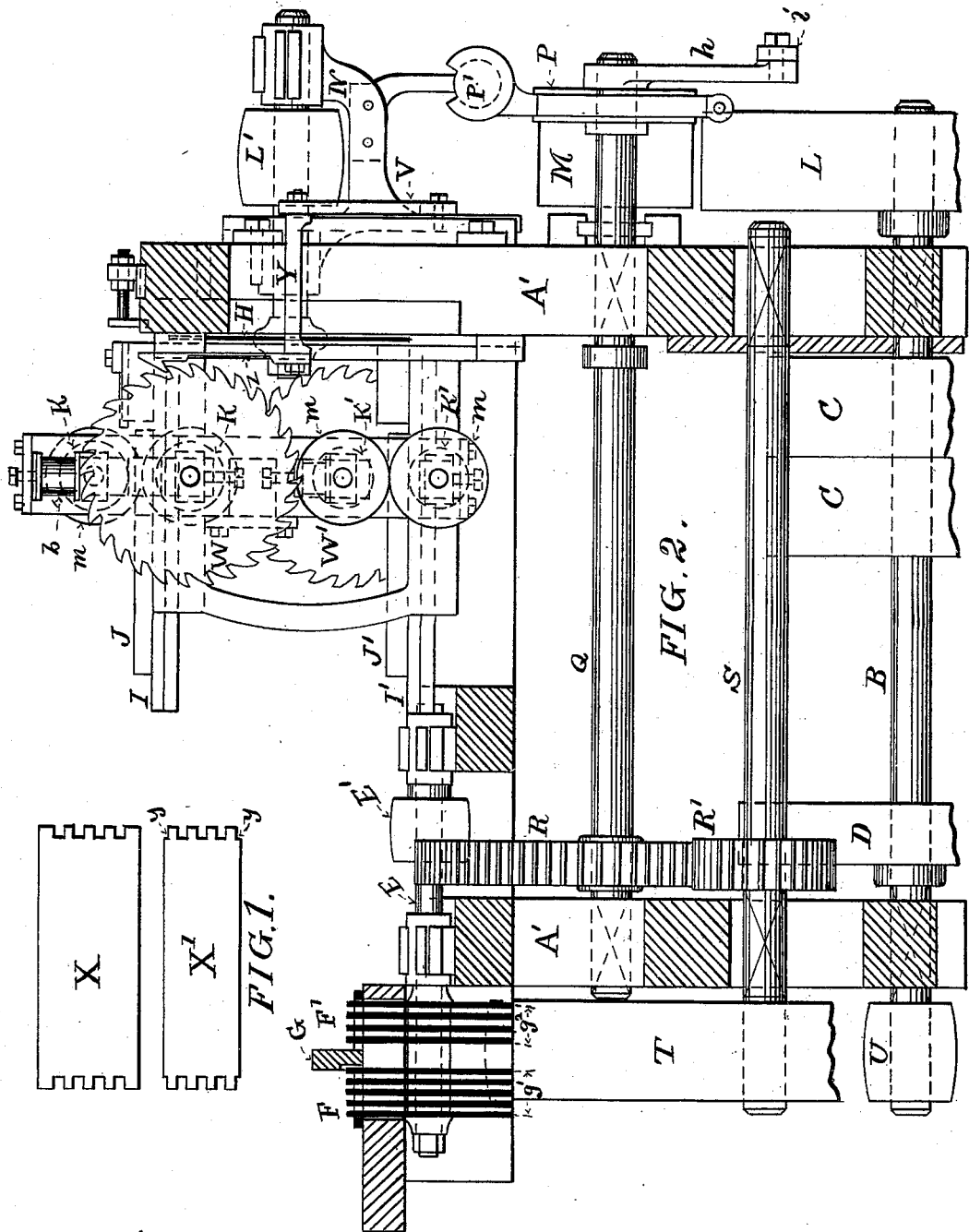
Witnesses,
T. J. Stirling.
Elmer H. Cox.
Inventor,
James Ware.

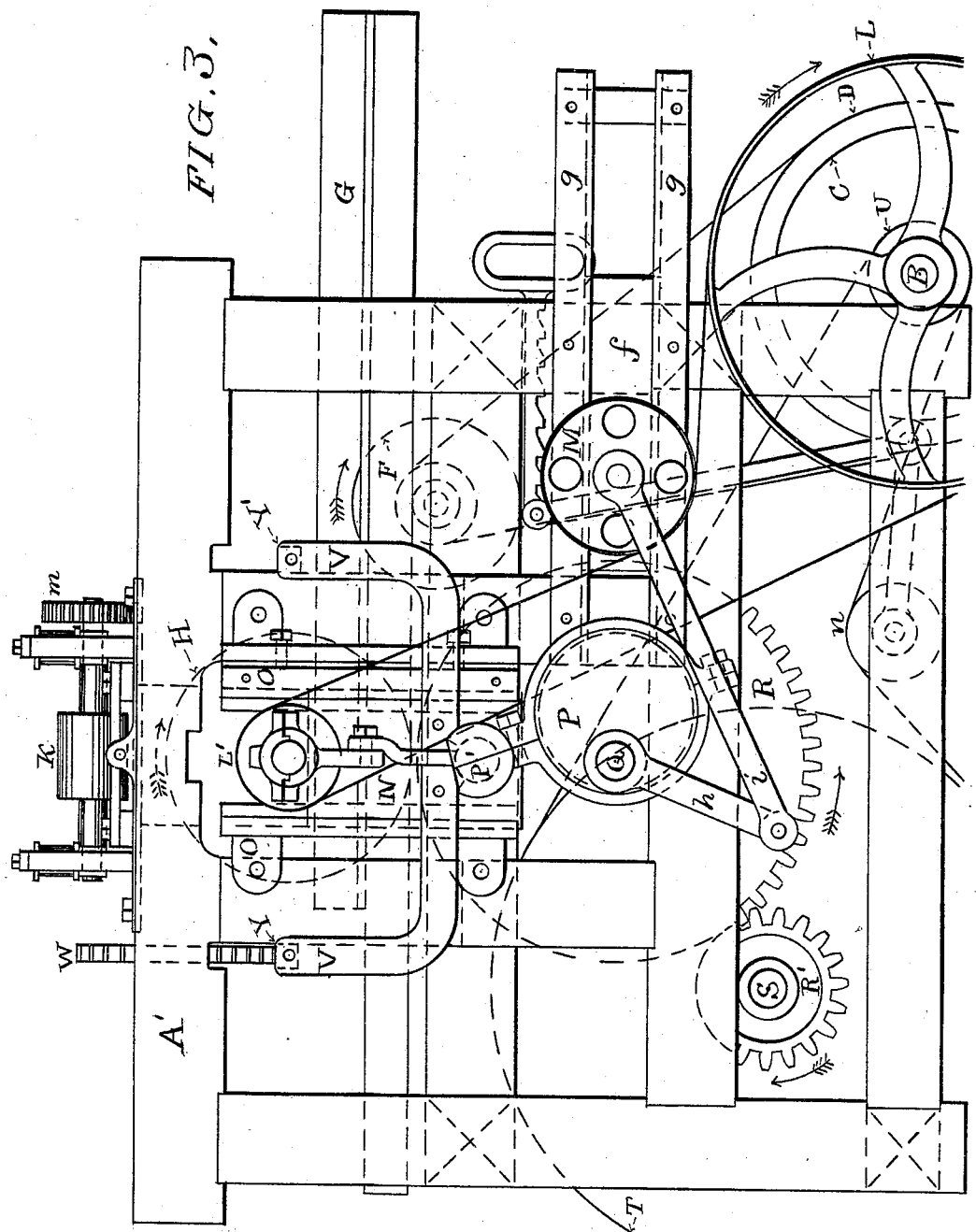

(No Model.) 3 Sheets—Sheet 3.

J. WARE.
MACHINE FOR MAKING HONEY FRAMES.

No. 384,549. Patented June 12, 1888.

Witnesses,
T. J. Stirling.
Elmer H. Cox.

Inventor,
James Ware.

UNITED STATES PATENT OFFICE.

JAMES WARE, OF MADERA, CALIFORNIA.

MACHINE FOR MAKING HONEY-FRAMES.

SPECIFICATION forming part of Letters Patent No. 384,549, dated June 12, 1888.

Application filed December 27, 1887. Serial No. 259,162. (No model.)

*To all whom it may concern:*

Be it known that I, JAMES WARE, a citizen of the United States, residing at Madera, in the county of Fresno and State of California, have invented a new and useful Machine for the Making of Honey Frames or Boxes for Bee-Hives, of which the following is a specification.

My invention relates to a machine in which a double gang of circular saws operate in connection with a vertically-reciprocating circular saw, with an automatic take-up pulley or tightener for the belt of same, and a double intermittent feed-motion acting alternately.

The object of my machine is the great facility and quickness with which the said honey frames or boxes can be made. The complete machine is illustrated in the accompanying drawings, in which—

Figure 1 shows the pieces or parts of the frame or box made by the machine to an enlarged scale as compared with the other figures of drawings; Fig. 2, a vertical section on line A A of Fig. 4; Fig. 3, an end elevation, and Fig. 4 a plan, of the entire machine.

Similar letters refer to similar parts throughout the several views.

Each frame or box consists of four (4) pieces, two of X and two of X', forming when put together a square frame having no top or bottom. The bee-hive is filled with these frames, piled one upon another, and in each one a separate layer of honey-comb will be deposited by the bees.

In the putting together of the frames the two pieces X are placed opposite each other, and the two pieces X' also opposite each other, with the tenons of the latter fitting into the mortises of the former.

It will be seen that the pieces X' are narrower than pieces X. This is for the purpose of forming a space between the frames on two opposite sides when piled on each other, to allow of a circulation of air between the layers of comb and for the access of the bees. The machine itself consists of a wooden frame, A', on which is mounted the various parts, as shown by drawings.

B is the main driving-shaft of the machine, which receives its motion from the source of power by means of the pulleys C C, one of which is tight and the other loose, to enable the machine to be stopped at will by the shifting of the driving-belt from one to the other.

On the shaft B is secured the pulley D, which communicates motion to the saw-arbor E by an endless belt which runs over the pulley E' on said arbor. On the end of this arbor are secured two gangs of circular saws, F and F', Figs. 2 and 4. The gang F consists of five (5) saws and is used for cutting the mortises and notches $y$ in ends of pieces X', and the gang F' of four (4) saws is used for cutting the mortises in ends of pieces X. (See Fig. 1.)

There is a guide-bar, G, Figs. 2 and 3, between these gangs of saws for guiding the lumber in its passage over them. The pieces X' are of a width corresponding to the distance ($g'$, Fig. 2) from center to center of the two outer saws of gang F, and the width of pieces X is somewhat more than the distance over all ($g^2$, Fig. 2) of the gang F'.

It will be seen by Fig. 2 that the guide-bar G is notched for the reception of half of the thickness of inner saw of gang F, so that the latter will cut a kerf correspondingly. This is to allow for the notches $y$ of pieces X' to be of half the width of the mortises in same.

The lumber from which the pieces X and X' are made can be of any length, but must be of a width and thickness corresponding to the length and width of pieces X and X'. These pieces are cut off from the ends of their respective pieces of timber by the vertically-reciprocating circular saw H, to be hereinafter described, their thickness being regulated by the amount of feed given. The pieces, however, must be cut with the grain of the wood, so as not to split. After the sticks of timber have passed the saws F and F', over which they are pushed by hand, and having been grooved or mortised on both opposite narrow sides for their entire length by the same, they are placed on the beds I and I', Figs. 2 and 4, between the guides J J and J' J', whose distance apart corresponds to the width of the stick or to the length of pieces X and X'. The thinner stick for pieces X' is placed on the upper bed, I, and the thicker one for pieces X on the lower bed, I', and automatically fed by the rolls K K and K' K' to the vertically-reciprocating circular saw H, which in rising cuts off a piece from the end of stick X', and in lowering cuts off the same from end of stick X.

The thickness of these pieces is regulated by the amount of feed. The saw H receives its rotary motion by means of an endless belt running from pulley L on main driving-shaft B to pulley L' on its own arbor. The saw H is mounted on a frame, N, which slides up and down between fixed guides O O. This reciprocating motion is communicated to the saw-frame N by the eccentric P, through shaft Q and gears R and R', and shaft S, with its pulley T, to main shaft B by its pulley U, all as shown by the drawings.

The eccentric P is connected with the sliding frame N by a universal or ball joint, P', which allows of its angular motion while frame N moves vertically.

The travel of the saw of course corresponds to the throw of eccentric.

Upon the face of sliding frame N is bolted the U shaped arm V, each extremity of which carries a straight bar, Y and Y', Fig. 2, to which are secured the adjustable spring-pawls Z, one of which extends up and communicates with ratchet-wheel W on shaft of feed-roll K, (see Fig. 2,) and the other (not shown, being on the opposite side of machine) extends down and communicates with ratchet-wheel W'.

It will be seen that when the frame N is moving down, the pawl Z, engaging with ratchet-wheel W, causes the latter to revolve through a short arc, the length of which can be regulated by the adjustment of Z higher or lower on the arm Y, the hub of Z having a slot for that purpose. This rotary motion is communicated through the shaft to feed-roller K, which moves the stick of timber correspondingly forward to the saw. The same motion is communicated to roll K' during the upward movement of frame N by the arm and pawl on the other side of machine and the ratchet-wheel W'.

Each pair of feed-rolls is connected together by gears or friction-rollers $m$ $m$ on the opposite ends of shafts from their respective ratchet-wheels W and W'.

The rolls are adjusted for distance apart by set-screws, Fig. 2, while rubber springs $b$ allow of any inequality in the thickness of stuff passing between them.

The taking up of the slack of the belt, which revolves the saw H through pulley L' during its vertical movement up and down, is provided for as follows: A pulley, M, in contact with belt, Fig. 3, revolves on a pin secured to a slide, $f$, moving in guides $g$ $g$. This pulley is connected to shaft Q by the link $i$ and crank $h$. This crank is secured to shaft Q in such a position that during the upward movement of frame N, when the belt requires to be lengthened, the revolution of crank $h$ will cause the pulley M to move outward in a direction away from the belt, thus allowing it to lengthen out, while during the downward movement of N it (the pulley M) will be moved inward against the belt, thus taking up the slack or shortening it. The feed-motion and vertical reciprocating movement of saw H can be stopped independently of the rotary motion by means of the tightener-pulley $n$, with its crank, link, and handle, as shown by Fig. 3.

What I claim as my invention, and desire to secure by Letters Patent, is—

1. The vertically-reciprocating saw-frame N, having the circular saw H mounted therein and arranged to cut at top and bottom in its movements up and down, in combination with two pairs of feed-rolls, and means consisting of ratchet W W', spring-pawls Z, bars Y Y', and U-shaped arm V, for operating the feed-rolls from the reciprocating frame, substantially as described.

2. The automatic saw-belt take-up or tightener-pulley M, guides $g$ $g'$ in which it slides, a shaft, Q, links $i$, and crank $h$, mounted adjustably on the shaft, in combination with the saw-arbor and its movable frame connected by means of an eccentric to said shaft, substantially as described.

JAMES WARE.

Witnesses:
THOMAS J. STIRLING,
ELMER H. COX.